United States Patent
Huh et al.

(10) Patent No.: US 9,766,383 B2
(45) Date of Patent: Sep. 19, 2017

(54) METHOD OF MANUFACTURING DOUBLE-SIDED POLARIZING PLATE AND DOUBLE-SIDED POLARIZING PLATE MANUFACTURED USING THE SAME

(71) Applicant: LG CHEM, LTD., Seoul (KR)

(72) Inventors: Eun-Soo Huh, Daejeon (KR); Eun-Mi Seo, Daejeon (KR); Kwang-Seung Park, Daejeon (KR); Mi-Rin Lee, Daejeon (KR); Yong-Il Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 37 days.

(21) Appl. No.: 14/361,249

(22) PCT Filed: Feb. 21, 2014

(86) PCT No.: PCT/KR2014/001419
§ 371 (c)(1),
(2) Date: May 28, 2014

(87) PCT Pub. No.: WO2014/129841
PCT Pub. Date: Aug. 28, 2014

(65) Prior Publication Data
US 2015/0277008 A1  Oct. 1, 2015

(30) Foreign Application Priority Data

Feb. 21, 2013  (KR) .................. 10-2013-0018780
Feb. 20, 2014  (KR) .................. 10-2014-0019770

(51) Int. Cl.
G02B 5/30 (2006.01)
B32B 37/12 (2006.01)
B32B 37/18 (2006.01)
B32B 38/00 (2006.01)

(52) U.S. Cl.
CPC ........ *G02B 5/3033* (2013.01); *B32B 37/1207* (2013.01); *B32B 38/0036* (2013.01); *B32B 37/1284* (2013.01); *B32B 2037/1253* (2013.01); *B32B 2307/412* (2013.01); *B32B 2307/42* (2013.01); *B32B 2309/02* (2013.01); *B32B 2309/105* (2013.01); *B32B 2310/0806* (2013.01); *B32B 2310/0831* (2013.01); *B32B 2457/20* (2013.01); *B32B 2551/00* (2013.01); *Y10T 428/24942* (2015.01)

(58) Field of Classification Search
None
See application file for complete search history.

(56) References Cited

U.S. PATENT DOCUMENTS

2003/0004278 A1   1/2003  Asano et al.
2007/0146887 A1*  6/2007  Ikeda ................ G02B 1/111
                                              359/586
2008/0100780 A1*  5/2008  Suzuki ............... G02B 5/3033
                                              349/96
2009/0115945 A1*  5/2009  Inokuchi ............ G02B 5/3033
                                              349/96
2009/0275718 A1   11/2009 Um et al.
2012/0057230 A1   3/2012  Murakami et al.
2012/0194907 A1*  8/2012  Suzuki ................. C09D 5/006
                                              359/489.02
2013/0279003 A1*  10/2013 Seo ...................... G02B 1/04
                                              359/483.01

FOREIGN PATENT DOCUMENTS

| CN | 102417807 A | 4/2012 |
|---|---|---|
| CN | 102778717 A | 11/2012 |
| JP | 2000-230016 A | 8/2000 |
| JP | 2001-151814 A | 6/2001 |
| JP | 2002-120326 A | 4/2002 |
| JP | 2008-276136 A | 11/2008 |
| JP | 2008276136 A * | 11/2008 |
| JP | 2010-209126 | 9/2010 |
| JP | 2010-230806 A | 10/2010 |
| JP | 2010230806 A | 10/2010 |
| JP | 2010230806 A1 * | 10/2010 |
| JP | 2011-039362 | 2/2011 |
| JP | 2011-081359 A | 4/2011 |
| JP | 2011-236389 A | 11/2011 |
| JP | 2012-063773 | 3/2012 |
| JP | 2012063773 A * | 3/2012 |
| JP | 2012-241053 A | 12/2012 |
| KR | 10-2008-0099168 A | 11/2008 |
| KR | 10-2009-0115040 A | 11/2009 |
| KR | 10-0973677 B1 | 7/2010 |
| KR | 10-2012-0030937 A | 3/2012 |
| KR | 1020120030937 A | 3/2012 |
| TW | 201038697 A1 | 11/2010 |

(Continued)

OTHER PUBLICATIONS

Machine_English_translation of JP_2010230806_A1 ; Method for Manufacturing Polarizing Plate, Polarizing Plate and Liquid Crystal Display; Oct. 14, 2010; JPO; whole document.*
Machine English Translation_JP_2008276136_A; Kumakura, M; Film Bonding Device and Polarizer Manufacturing Device; Nov. 13, 2008; JPO; whole document.*
Machine English Translation_JP2012063773_A; Sim, H.; Water-Type Primer Composition; Mar. 29, 2012; JPO; whole document.*

*Primary Examiner* — Tahseen N Khan
(74) *Attorney, Agent, or Firm* — Dentons US LLP

(57) ABSTRACT

A method of manufacturing a double-sided polarizing plate and a double-sided polarizing plate manufactured using the same are provided. The method of manufacturing a double-sided polarizing plate includes attaching transparent films to both surfaces of a polarizer by means of adhesive layers, irradiating the adhesive layers with active energy rays emitted by an energy source disposed in a single direction with respect to the polarizer, and thermally treating a surface of the transparent film disposed opposite to the energy source at a temperature of 25° C. to 65° C.

10 Claims, No Drawings

(56) References Cited

FOREIGN PATENT DOCUMENTS

TW           201229162  A1      7/2012
WO        2012/144260  A1     10/2012

* cited by examiner

METHOD OF MANUFACTURING DOUBLE-SIDED POLARIZING PLATE AND DOUBLE-SIDED POLARIZING PLATE MANUFACTURED USING THE SAME

This application is a National Stage Application of International Application No. PCT/KR2014/001419 filed on Feb. 21, 2014, and claims priority to Korean Application Nos. 10-2013-0018780, filed on Feb. 21, 2013 and 10-2014-0019770 filed Feb. 20, 2014, all of which are hereby incorporated by reference in their entirety.

TECHNICAL FIELD

The present invention relates to a method of manufacturing a double-sided polarizing plate and a double-sided polarizing plate manufactured using the same.

BACKGROUND ART

A polarizing plate is an apparatus configured to convert natural light into polarized light having a certain vibration direction. In recent years, polarizing plates have been applied to various display devices such as Liquid Crystal Display (LCD) devices, Organic Light Emitting Diode (OLED) devices and the like.

Such a polarizing plate is generally used in a structure in which a protective film is attached to one or both surfaces of a polarizer by means of an adhesive, wherein the polarizer is formed of a polyvinyl alcohol (hereinafter referred to as 'PVA')-based resin stained with a dichroic dye or iodine. In the prior art, a triacetyl cellulose (TAC)-based film has been widely used as a protective film configured to protect such a polarizing plate. However, such TAC-based films have problems in that these films may be easily deformed under conditions of high temperature and high humidity. Therefore, protective films formed of various materials, able to be substituted for such TAC films, are currently in development. For example, alternative methods of forming such protective films using polyethylene terephthalate (PET), cycloolefin polymer (COP), acrylic film and the like, alone or in combination, have been proposed.

Meanwhile, an aqueous adhesive composed of an aqueous solution of a polyvinyl alcohol-based resin has been generally used as an adhesive with which to attach such a protective film to a polarizer plate.

However, such an aqueous adhesive may have a problem in that uses thereof are limited according to materials used in film formation, since this aqueous adhesive has weak adhesive strength when an acrylic film or a COP film is used as the protective film instead of the TAC film. Also, this aqueous adhesive has problems in that when the protective films applied to both surfaces of a PVA element are formed of different materials, curling may occur in edge portions of the polarizing plate in a process of drying the aqueous adhesive, and initial optical properties may be deteriorated in addition to poor adhesive strength caused according to different types of materials used in films. Accordingly, a non-aqueous photocurable adhesive was proposed as an alternative to solve the above-listed problems.

However, in the prior art, when such a non-aqueous photocurable adhesive is applied to a double-sided polarizing plate in which protective films are attached to both surfaces of the polarizer, adhesive layers formed on both surfaces of the polarizer should be cured, leading to difficulties in processes in which both adhesive layers must be irradiated with light.

Meanwhile, to simplify a manufacturing process, when the adhesive layers formed on both surfaces of the polarizer are cured through a single irradiation process, degrees of curing of the adhesive layers may be different, due to differences in quantities of light reaching a light-irradiated surface and a non-light-irradiated surface, resulting in deteriorated adhesive strength in the non-light-irradiated surface. When the adhesive strength of the adhesive layers is deteriorated as described above, durability of the polarizing plate may be degraded, leading to deteriorated optical properties.

DISCLOSURE

Technical Problem

The present invention is designed to solve the problems of the prior art, and therefore an object of the present invention is to provide a method of manufacturing a double-sided polarizing plate and a double-sided polarizing plate manufactured using the same. Here, the method is developed to improve a curing rate of non-light-irradiated surfaces of the adhesive layers and exhibit an excellent degree of adhesive strength by curing adhesive layers formed on both surfaces of a polarizer through simultaneous light irradiation and thermal curing processes performed on the non-light-irradiated surfaces.

Technical Solution

To solve the above problems, an aspect of the present invention provides a method of manufacturing a double-sided polarizing plate, including attaching transparent films to both surfaces of a polarizer by means of adhesive layers, irradiating the adhesive layers with active energy rays emitted by an energy source disposed in a single direction with respect to the polarizer, and thermally treating a surface of the transparent film disposed opposite to the energy source at a temperature of 25° C. to 65° C.

Another aspect of the present invention provides a double-sided polarizing plate manufactured using the above-described method of manufacturing a double-sided polarizing plate according to the present invention.

Advantageous Effects

The method of manufacturing a double-sided polarizing plate according to the present invention includes thermally treating a surface of a transparent film, not irradiated with active energy rays, at a temperature of 25° C. to 65° C. As a result, the method according to the present invention can be useful in improving a curing rate of a non-light-irradiated surface, thereby simultaneously forming adhesive layers having excellent adhesive strength on both surfaces of the polarizer in a single irradiation process with active energy rays and simplifying a manufacturing process.

The double-sided polarizing plate according to the present invention manufactured thus has excellent adhesive strength between the polarizer and transparent film, as well as excellent aesthetic characteristics and optical properties.

Best Mode

Hereinafter, preferred embodiments of the present invention will be described in detail referring to the accompanying drawings. Prior to the description, it should be understood that the terms used in the specification and appended claims should not be construed as being limited to general and dictionary meanings, but should be interpreted on the basis of the principle that the inventor is able to appropriately define terms, meanings and concepts corresponding to technical aspects of the present invention without restrictions in order to provide the best explanation possible. Therefore, the description proposed herein is merely a preferable example for the purposes of illustration only, and should not be construed as limiting the scope of the invention, so it should be understood that other equivalents and modifications could be made thereto without departing from the scope of the invention.

In a conventional method of manufacturing a double-sided polarizing plate, when adhesive layers are irradiated with light once, the adhesive layer arranged in a direction of light irradiation may have sufficient adhesive strength, but the adhesive layer arranged in a direction of non-light irradiation may have a low curing rate, since only approximately 20% of available light may have reached the adhesive layer, resulting in deteriorated adhesive strength. Therefore, to achieve sufficient adhesive strength in the adhesive layer formed on the non-light-irradiated surface, the adhesive layers formed on both surface of the polarizer should be separately cured by irradiation with light. In this case, a manufacturing process may be somewhat complicated.

However, the present inventors have conducted research, and surprisingly, found that when a surface of a film, not irradiated with active energy rays, is thermally treated simultaneously with irradiation using the active energy rays or after irradiation using the active energy rays, a curing degree of the adhesive layer formed on the non-light-irradiated surface can be improved, and thus, excellent adhesive strength can be ensured in both adhesive layers formed on both surfaces of the polarizer by a single irradiation with active energy rays. Therefore, the present invention was completed based on these facts.

More particularly, the present invention is directed to a method of manufacturing a double-sided polarizing plate, including 1) attaching transparent films to both surfaces of a polarizer by means of adhesive layers, 2) irradiating the adhesive layers with active energy rays emitted by an energy source disposed in a single direction with respect to the polarizer, and 3) thermally treating a surface of the transparent film disposed opposite to the energy source at a temperature of 25° C. to 65° C.

In this specification, the term "double-sided polarizing plate" refers to a polarizing plate having a structure in which protective films are attached to both surfaces thereof. This is a concept clearly distinct from a single-sided polarizing plate in which a protective film is only attached to one surface of the polarizer.

Hereinafter, respective operations of the manufacturing method according to the present invention will be described in further detail.

First, transparent films are attached to both surfaces of a polarizer by means of adhesive layers.

In this case, the polarizer is not particularly limited. For example, polarizers widely known in the related art, for example, films formed of polyvinyl alcohol (PVA) and including iodine or a dichroic dye may be used herein. The polarizer may be manufactured by staining a PVA film with an iodine or dichroic dye, but a method of manufacturing the polarizer is not particularly limited. In this specification, the term "polarizer" refers to a plate not including a protective film, while the term "polarizing plate" refers to a plate including a polarizer and a protective film.

Meanwhile, the adhesive layer may be formed of an active energy ray-curable adhesive, and preferably, may be formed of a cationic adhesive. Here, the cationic adhesive refers to an adhesive including a compound, cured through a cationic polymerization reaction, as a main ingredient.

For example, the cationic adhesive may include (1) 5 to 90 parts by weight of an epoxy compound having at least two epoxy groups in the molecule; (2) 5 to 90 parts by weight of an oxetane compound having at least one oxetanyl group in the molecule; and (3) 0.5 to 20 parts by weight of a cationic photopolymerization initiator.

Types of the epoxy compound (1) are not particularly limited as long as they have at least two epoxy groups in the molecule. For example, epoxy resins widely known in the related art such as aromatic epoxy, alicyclic epoxy or aliphatic epoxy may be used alone or in combination.

In this case, the aromatic epoxy refers to an epoxy having an aromatic group in the molecule. For example, bisphenol-type epoxy resins such as a bisphenol A-based epoxy, a bisphenol F-based epoxy, a bisphenol S-based epoxy, and a brominated bisphenol-based epoxy; a novolac-type epoxy resin such as a phenol novolac-type epoxy resin or a cresol novolac-type epoxy resin; cresol epoxy; resorcinol glycidyl ether, and the like may be used as the aromatic epoxy.

Meanwhile, the alicyclic epoxy refers to a compound in which an epoxy group is formed between two adjacent carbon atoms constituting an aliphatic ring. For example, dicyclopentadiene dioxide, limonene dioxide, 4-vinylcyclohexene dioxide, 2,4-epoxycyclohexylmethyl 3,4-epoxycyclohexanecarboxylate, dicyclopentadiene dioxide, or bis(3,4-epoxycyclohexylmethyl)adipate may be used as the alicyclic epoxy.

Also, a polyglycidyl ether of aliphatic polyhydric alcohol; a polyglycidyl ether of alkylene oxide addition product with aliphatic polyhydric alcohol, or the like may be used as the aliphatic epoxy.

In this case, examples of the aliphatic polyhydric alcohol that may be used herein may, for example, include aliphatic polyhydric alcohols having 2 to 20 carbon atoms.

More particularly, the aliphatic polyhydric alcohol may, for example, include at least three polyols selected from the group consisting of aliphatic diols such as ethylene glycol, 1,2-propanediol, 1,3-propanediol, 2-methyl-1,3-propanediol, 2-butyl-2-ethyl-1,3-propanediol, 1,4-butanediol, neopentyl glycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, and 1,10-decanediol; alicyclic diols such as cyclohexanedimethanol, cyclohexanediol, hydrogenated bisphenol A, and hydrogenated bisphenol F; trimethylolethane, trimethylolpropane, hexitols, pentitols, glycerine, polyglycerine, pentaerythritol, dipentaerythritol, tetramethylolpropane, and the like.

More particularly, the alkylene oxide may, for example, include ethyleneoxide, propyleneoxide, butyleneoxide, and the like.

Meanwhile, according to the present invention, a combination of a first epoxy compound containing at least one epoxidized aliphatic group, that is, an alicyclic epoxy ring, and a second epoxy compound containing at least one glycidyl ether group is particularly preferably used as the epoxy compound, but the present invention is not limited thereto.

When the above-described combination of the first epoxy compound and the second epoxy compound is used, an adhesive for polarizing plate having improved thermal shock properties may be manufactured. In this case, the first epoxy compound and the second epoxy compound may be mixed at a weight ratio of 1:1 to 3:1, and more preferably a weight ratio of 1:1 to 2:1. Most preferably, the first epoxy compound and the second epoxy compound may be mixed at a weight ratio of 1:1. When the weight ratio of the first epoxy compound to the second epoxy compound satisfies this weight ratio range, the most preferred physical properties may be achieved in aspects of glass transition temperature, adhesive strength and viscosity. According to the present invention, the first epoxy and second epoxy compounds may be, for example, included in a content of 20 to 60 parts by weight, based on a total of 100 parts by weight of the adhesive composition.

The first epoxy compound may be, for example, at least one selected from the group consisting of 3,4-epoxycyclohexylmethyl-3,4'-epoxycyclohexanecarboxylate, bis(3,4-epoxycyclohexylmethyl)adipate dicyclopentadiene dioxide, limonene dioxide, and 4-vinylcyclohexene dioxide. The first epoxy compound serves to increase Tg and provide hardness to the adhesive layer. Most preferably, the first epoxy compound may be 3,4-epoxycyclohexylmethyl-3,4'-epoxycyclohexanecarboxylate.

Types of the second epoxy compound are not particularly limited as long as they contain one or more glycidyl ether groups. For example, the second epoxy compound may be at least one selected from the group consisting of 1,4-cyclohexanedimethanol diglycidyl ether, novolac epoxy, bisphenol A-based epoxy, bisphenol F-based epoxy, brominated bisphenol-based epoxy, 1,6-hexanedioldiglycidyl ether, trimethylolpropanetriglycidyl ether, n-butyl glycidyl ether, aliphatic glycidyl ether ($C_{12}$-$C_{14}$), 2-ethylhexyl glycidyl ether, phenyl glycidyl ether, o-cresyl glycidyl ether, and nonyl phenyl glycidyl ether. The second epoxy compound serves to provide softness in order to enhance adhesive strength. In this case, the second epoxy compound is more preferably an epoxy compound containing an aliphatic ring, and most preferably 1,4-cyclohexanedimethanol diglycidyl ether.

Next, types of the oxetane compound (2) are not particularly limited as long as they have at least one oxetanyl group in the molecule. For example, various oxetane compounds widely known in the related art may be used as the oxetane compound. The oxetane compound according to the present invention may, for example, include 3-ethyl-3-[(3-ethyloxetan-3-yl)methoxymethyl]oxetane, 1,4-bis[(3-ethyloxetan-3-yl)methoxymethyl]benzene, 1,4-bis[(3-ethyloxetan-3-yl)methoxy]benzene, 1,3-bis[(3-ethyloxetan-3-yl)methoxy]benzene, 1,2-bis[(3-ethyloxetan-3-yl)methoxy]benzene, 4,4'-bis[(3-ethyloxetan-3-yl)methoxy]biphenyl, 2,2'-bis[(3-ethyloxetan-3-yl)methoxy]biphenyl, 3,3',5,5'-tetramethyl-4,4'-bis[(3-ethyloxetan-3-yl)methoxy]biphenyl, 2,7-bis[(3-ethyloxetan-3-yl)methoxy]naphthalene, bis[4-{(3-ethyloxetan-3-yl)methoxy}phenyl]methane, bis[2-{(3-ethyloxetan-3-yl)methoxy}phenyl]methane, 2,2-bis[4-{(3-ethyloxetan-3-yl)methoxy}phenyl]propane, an etherified modification product of a novolac-type phenol-formaldehyde resin by 3-chloromethyl-3-ethyloxetane, 3(4),8(9)-bis[(3-ethyloxetan-3-yl)methoxymethyl]-tricyclo[5.2.1.0 2,6]decane, 2,3-bis[(3-ethyloxetan-3-yl)methoxymethyl]norbornane, 1,1,1-tris[(3-ethyloxetan-3-yl)methoxymethyl]propane, 1-butoxy-2,2-bis[(3-ethyloxetan-3-yl)methoxymethyl]butane, 1,2-bis{2-(3-ethyloxetan-3-yl)methoxy}ethylthio]ethane, bis[{4-(3-ethyloxetan-3-yl)methylthio}phenyl]sulfide, 1,6-bis[(3-ethyloxetan-3-yl)methoxy]-2,2,3,3,4,4,5,5-octafluorohexane, and the like. Meanwhile, the content of the oxetane compound may be in a range of approximately 5 to 90 parts by weight, and more preferably approximately 10 to 90 parts by weight.

Subsequently, the cationic photopolymerization initiator (3) refers to a compound forming a cationic cationic species or Lewis acid by irradiation with active energy rays. For example, the cationic photopolymerization initiator may include an onium salt such as an aromatic diazonium salt, an aromatic iodine aluminum salt or an aromatic sulfonium salt, iron-arene complex, and the like, but the present invention is not limited thereto. Meanwhile, the content of the cationic photopolymerization initiator is in a range of approximately 0.5 to 20 parts by weight, preferably approximately 0.5 to 15 parts by weight, and more preferably approximately 0.5 to 10 parts by weight, based on a total of 100 parts by weight of the adhesive composition.

Meanwhile, in addition to the above-listed components, the cationic adhesive composition according to the present invention may further include a vinyl-based compound, as necessary. When the vinyl-based compound is added, low viscosity may be maintained, and a decrease in a glass transition temperature of the adhesive layer after curing may be suppressed. For example, hydroxyl $C^{1-6}$ alkylvinylether and/or vinyl acetate may be used as the vinyl-based compound. Here, the hydroxy $C_{1-6}$ alkylvinylether may be at least one selected from the group consisting of hydroxyl ethylvinylether, hydroxyl butylvinylether, 1,4-cyclohexanedimethanol vinylether, 4-(hydroxymethyl)cyclohexylmethyl vinylether, ethylene glycolvinylether, and diethylene glycol monovinylether. Meanwhile, the vinyl-based compound may be included in a content of 0.1 parts by weight to 10 parts by weight, or 0.1 parts by weight to 5 parts by weight, based on a total of 100 parts by weight of the adhesive composition.

In addition to the components, the cationic adhesive composition according to the present invention may also further include a silane coupling agent, as necessary. When the silane coupling agent is included, the silane coupling agent may function to reduce the surface energy of an adhesive, thereby improving wetting properties of the adhesive.

In this case, the silane coupling agent more preferably includes a cationic polymerizable functional group such as an epoxy group, a vinyl group, or a radical group. The present inventors have found that wetting properties can be improved without causing a decrease in a glass transition temperature of the adhesive when the silane coupling agent containing the cationic polymerizable functional group is used, compared to when a surfactant or a silane coupling agent which does not contain the cationic polymerizable functional group is used. This is considered to be due to the fact that cross-linking occurs while the cationic polymerizable functional group of the silane coupling agent reacts with a silane group of the adhesive composition, thereby causing a decrease in glass transition temperature of the adhesive layer after curing.

The silane coupling agent usable in the present invention may, for example, be a silane coupling agent represented by the following Formula 1, but the present invention is not limited thereto.

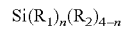   [Formula 1]

In Formula 1, $R_1$ represents a cationic polymerizable functional group bound to a silicon atom, that is, a functional group containing a cyclic ether group or vinyloxy group, $R_2$ represents hydrogen, a hydroxyl group, an alkyl group, or an alkoxy group, all of which are bound to a silicon atom, and n is an integer ranging from 1 to 4.

Specific examples of the silane coupling agent satisfying Formula 1 may include 2-(3,4-epoxycyclohexyl)ethyl trimethoxy silane, 3-glycidoxypropyl trimethoxy silane, glycidoxypropyl methyldiethoxy silane, glycidoxypropyl triethoxy, vinyltrimethoxy silane, or vinyltriethoxy silane, but the present invention is not limited thereto.

Also, an oligomer-type silane compound in which the above-described cationic polymerizable functional group is introduced into the molecule of a siloxane oligomer may also be used as the silane coupling agent usable in the present invention. In this case, the siloxane oligomer may be a silicone resin having a relatively low molecular weight, in which the end of a molecular chain is blocked with an alkoxysilyl group.

In this case, the cationic adhesive composition may include the silane compound at a content of 0.1 parts by weight to 10 parts by weight, or 0.1 parts by weight to 5 parts by weight, based on a total of 100 parts by weight of the adhesive composition. Within this content range, proper surface energy and adhesiveness of the adhesive layer may be expressed.

Meanwhile, the cationic adhesive composition according to the present invention may further include a radical polymerizable monomer, as necessary. Compounds containing a radical-reactive functional group may be used as the radical polymerizable monomer without limitation. For example, a (meth)acrylate, a (meth)acrylamide, a maleimide, (meth)acrylic acid, maleic acid, itaconic acid, (meth)acrylaldehyde, (meth) acryloylmorpholine, N-vinyl-2-pyrrolidone or triallyl isocyanurate, all of which has one or more (meth)acryloyl groups in the molecule, may be used as the radical polymerizable monomer.

In this case, specific examples of the (meth)acrylate having one or more (meth)acryloyl groups in the molecule may include methyl (meth)acrylate, ethyl(meth)acrylate, propyl(meth)acrylate, isopropyl(meth)acrylate, butyl (meth)acrylate, isobutyl(meth) acrylate, 2-ethylhexyl (meth)acrylate, octyl(meth)acrylate, isooctyl (meth)acrylate, lauryl (meth)acrylate, stearyl (meth)acrylate, 2-hydroxyethyl (meth)acrylate, 2-hydroxypropyl (meth)acrylate, 4-hydroxybutyl (meth)acrylate, cyclohexyl(meth)acrylate, isobornyl(meth)acrylate, 1,4-cyclohexanedimethylol mono (meth)acrylate, dicyclopentanyl (meth)acrylate, dicyclopentenyl(meth)acrylate, dicyclopentenyloxyethyl(meth)acrylate, benzyl (meth)acrylate, (meth)acrylate of a phenolalkylene oxide addition product, a (meth)acrylate of a p-cumylphenolalkylene oxide addition product, a (meth)acrylate of an o-phenylphenolalkylene oxide addition product, a (meth)acrylate of a nonylphenolalkylene oxide addition product, 2-methoxyethyl (meth)acrylate, ethoxyethoxyethyl(meth)acrylate, a(meth)acrylate of an alkylene oxide addition product with 2-ethylhexylalcohol, ethylene glycol mono(meth)acrylate, propyleneglycol mono(meth)acrylate, pentanediol mono(meth)acrylate, hexanediol mono(meth)acrylate, a mono(meth)acrylate of diethylene glycol, a mono(meth)acrylate of triethylene glycol, a mono(meth)acrylate of tetraethylene glycol, a mono(meth)acrylate of polyethylene glycol, a mono(meth)acrylate of dipropyleneglycol, a mono(meth)acrylate of tripropyleneglycol, a mono(meth)acrylate of polypropyleneglycol, 2-hydroxy-3-phenoxypropyl(meth)acrylate, 2-hydroxy-3-butoxypropyl (meth)acrylate, tetrahyrdo furfuryl(meth)acrylate, caprolactone-modified tetrahyrdo furfuryl(meth)acrylate, 2-ethyl-2-methyl-1,3-dioxolan-4-yl)methyl(meth)acrylate, (2-isobutyl-2-methyl-1,3-dioxolan-4-yl)methyl (meth)acrylate, (1,4-dioxaspiro[4,5]decan-2-yl)methyl (meth)acrylate, glycidyl (meth)acrylate, 3,4-epoxycyclohexylmethyl(meth)acrylate, (3-ethyloxetan-3-yl)methyl (meth)acrylate, 2-(meth)acryloyloxymethylisocyanate, allyl (meth)acrylate, N-(meth)acryloyloxyethylhexahydrophthalimide, N-(meth)acryloyloxyethyltetrahydrophthalimide, 2-(meth)acryloyloxyethylhexahydrophthalic acid, 2-(meth)acryloyloxyethylsuccinic acid, ω-carboxypolycaprolactonemono(meth)acrylate, or 2-(meth)acryloyloxyethyl acid phosphate.

Also, specific examples of the (meth)acrylamide may include (meth)acrylamide, N,N-dimethyl(meth)acrylamide, N,N-diethyl(meth)acrylamide, N-methylol(meth)acrylamide, N-(3-N,N-dimethylaminopropyl)(meth)acrylamide, methylenebis(meth)acrylamide, ethylenebis(meth)acrylamide, or N,N-diallyl (meth)acrylamide.

In addition, specific examples of the maleimide may include N-methylmaleimide, N-hydroxyethylmaleimide, N-hydroxyethylcitraconimide, N-hydroxyethylcitraconimide, or the like.

Specific examples of the (meth)acrylate containing two (meth)acryloyl groups in the molecule may include 1,3-butanediol di(meth)acrylate, 1,6-hexanediol di(meth)acrylate, 1,9-nonanediol di(meth)acrylate, 1,10-decanediol di(meth)acrylate, 1,3-butyleneglycol di(meth)acrylate, 2-methacryloyloxyethyl acid phosphate, ethylene glycol di(meth)acrylate, diethylene glycol di(meth)acrylate, triethylene glycol di(meth)acrylate, neopentyl glycol di(meth)acrylate, dipropyleneglycol di(meth)acrylate, tripropyleneglycol di(meth)acrylate, tetraethylene glycol di(meth)acrylate, cyclohexanedimethanol di(meth)acrylate, polyethylene glycol di(meth)acrylate, polyethylene glycol (200) di(meth)acrylate, polyethylene glycol (400) di(meth)acrylate, polyethylene glycol (600) di(meth)acrylate, glycerine di(meth)acrylate, 2-hydroxy-3-acrylooxypropylmethacrylate, or dimethyloltricyclodecane di(meth)acrylate.

Specific examples of the (meth)acrylate containing three (meth)acryloyl groups in the molecule may include trimethylolpropane tri(meth)acrylate, ditrimethylolpropane tri (meth)acrylate, trimethylpropane tri(meth)acrylate, tri(2-hydroxyethyl)isocyanurate triacrylate, tri(2-hydroxyethyl) isocyanurate, pentaerythritol triacrylate, ethoxylate trimethylolpropane tri(meth)acrylate, or proxylatetrimethylolpropane tri(meth)acrylate.

Specific examples of the (meth)acrylate containing four and/or five (meth)acryloyl groups in the molecule may include pentaerythritol tetra(meth)acrylate, ditrimethylolpropane tetra(meth)acrylate, dipentaerythritol penta(meth) acrylate, epoxylate pentaerythritoltetra(meth)acrylate, or pentaacrylate ester.

Specific examples of the (meth)acrylate containing six (meth)acryloyl groups in the molecule may include dipentaerythritol hexa(meth)acrylate, and the like.

Meanwhile, the content of the radical polymerizable monomer is in a range of approximately 0 parts by weight to 40 parts by weight, preferably approximately 5 parts by weight to 30 parts by weight, and more preferably approximately 5 parts by weight to 25 parts by weight, based on a total of 100 parts by weight of the adhesive composition.

Meanwhile, when the adhesive composition includes the radical polymerizable monomer as described above, it is preferred to blend a radical photopolymerization initiator in order to induce radical polymerization properties to increase a curing rate. The radical photopolymerization initiator that may be used herein may, for example, include an acetophenone-based photopolymerization initiator, a benzoin ether-based photopolymerization initiator, a benzophenone-based photopolymerization initiator, a thioxanthone-based photopolymerization initiator, and the like. The content of the radical photopolymerization initiator is in a range of approximately 0.5 to 20 parts by weight, preferably approximately 0.5 to 15 parts by weight, and more preferably approximately 0.5 to 10 parts by weight, based on a total of 100 parts by weight of the adhesive composition.

The cationic adhesive composition may further include a photosensitizing agent, an antioxidant, an oligomer, and an adhesion promoter, as necessary. In this case, the cationic adhesive composition may further include urethane acrylate at a content of greater than 0 or less than or equal to 4 parts by weight. When the cationic adhesive composition further includes the urethane acrylate, viscosity tends to increase, but the increased viscosity of the adhesive may be lowered by heating. Meanwhile, when the cationic adhesive composition further includes the urethane acrylate, more appropriate adhesive strength may be provided in the acrylic film.

In the method of manufacturing a double-sided polarizing plate according to the present invention, the above-described adhesive composition used to form adhesive layers preferably has a viscosity of approximately 15 cP to 50 cP. When the viscosity of the adhesive composition satisfies this viscosity range, the adhesive layer having a reduced thickness may be formed, and thus may have low viscosity. As a result, the adhesive composition exhibits excellent workability.

Also, the adhesive composition may have a glass transition temperature of 90° C. or higher after curing, and thus exhibit excellent heat resistance. In fact, when the polarizing plate manufactured using the cationic curable adhesive composition is measured for heat resistance, durability and thermal impact property at 80° C., it is revealed that the polarizer is not broken.

Further, when the polarizing plate manufactured using the adhesive composition is immersed in water having a temperature of 60° C. for 24 hours, the polarizer is discolored to less than 10 mm in a machine direction (i.e., an MD direction), indicating that the adhesive composition exhibits very excellent water resistance.

As such, since the cationic adhesive has excellent adhesive strength in the case of films made of various materials, and also exhibits excellent water resistance, heat resistance, and the like, the cationic adhesive may be used to manufacture polarizing plates having excellent characteristics.

Next, the transparent film is a compensation film configured to compensate for the optical properties of the polarizer or the protective film for polarizers. In this case, polymer films known in the related art may be used as the transparent film.

More particularly, the transparent film may, for example, be at least one selected from the group consisting of an acrylic film, a PET film, a PET film treated with an acrylic primer, a polynorbonene (PNB)-based film, a COP film, a polycarbonate film, and TAC films such as NRT (Fuji Film Co.), N TAC (Konica), V TAC (Fuji Film Co.), UZ TAC (Fuji Film Co.), and the like, but the present invention is not limited thereto. Among these, the transparent film is particularly preferably an acrylic film.

In the present invention, the acrylic film used as the transparent film may include a (meth)acrylate-based resin. Films including the (meth)acrylate-based resin may be obtained, for example, by molding a moldable material including the (meth)acrylate-based resin as a main ingredient through extrusion molding.

The acrylic film may be a film including a copolymer containing an alkyl (meth)acrylate-based unit and a styrene-based unit and an aromatic resin having a carbonate residue in the main chain, or a film including an alkyl (meth) acrylate-based unit, a styrene-based unit, a 3 to 6-membered heterocyclic unit having a functional group substituted with at least one carbonyl group, and a vinyl cyanide unit.

Also, the acrylic film may be a film including a (meth) acrylate-based resin having an aromatic ring. Examples of the (meth)acrylate-based resin having an aromatic ring may include a resin composition including (a) a (meth)acrylate-based unit containing at least one (meth)acrylate-based derivative; (b) an aromatic unit including an aromatic residue and a chain containing a hydroxyl group-containing residue; and (c) a styrene-based unit including at least one styrene-based derivative, as disclosed in Korean Patent Laid-open Publication No. 10-2009-0115040. The units (a) to (c) may be included in the form of separate copolymers in the resin composition, and at least two of the units (a) to (c) may be included in the form of one copolymer in the resin composition.

In addition, the acrylic film may be a film including an acrylic resin having a lactone ring structure. Specific examples of the (meth)acrylate-based resin having a lactone ring structure may, for example, include (meth)acrylate-based resins having a lactone ring structure as disclosed in Japanese Patent Laid-open Publication Nos. 2000-230016, 2001-151814, and 2002-120326.

The method of manufacturing an acrylic film is not particularly limited. For example, a film may be formed by thoroughly mixing a (meth)acrylate-based resin and other polymers and additives using any proper mixing method to prepare a thermoplastic resin composition, and molding the thermoplastic resin composition, or a film may be formed by preparing separate solutions using a (meth)acrylate-based resin and other polymers and additives, thoroughly mixing the solutions to prepare a uniform mixture solution, and molding the mixture solution.

The thermoplastic resin composition may, for example, be prepared by pre-blending film components using any suitable mixing machine such as an Omni mixer and extruding and kneading the resulting mixture. In this case, the mixing machine used for the extrusion and kneading is not particularly limited. For example, any suitable mixing machine such as a single-screw extruder or a double-screw extruder, or a dispersion kneader, may be used herein.

Meanwhile, the method of molding a film may, for example, include any suitable film molding methods such as solution casting method (i.e., a solution softening method), a melt extrusion method, a calendar method, an extrusion molding method, and the like. Among these methods of molding a film, the solution casting method and the melt extrusion method are preferred.

A solvent used in the solution casting method (i.e., a solution softening method) may, for example, include aromatic hydrocarbons such as benzene, toluene, and xylene; aliphatic hydrocarbons such as cyclohexane, and decaline; esters such as ethyl acetate, and butyl acetate; ketones such as acetone, methyl ethyl ketone, and methylisobutylketone; alcohols such as methanol, ethanol, isopropanol, butanol, isobutanol, methyl cellosolve, ethyl cellosolve, and butyl cellosolve; ethers such as tetrahydrofuran, and dioxane; halogenated hydrocarbons such as dichloromethane, chloroform, and carbon tetrachloride; dimethylformamide; dimethylsulfoxide, and the like. Here, the above-described solvents may be used alone or in a combination of two or more thereof.

An apparatus for performing the solution casting method (i.e., a solution softening method) may, for example, include a drum-type casting machine, a band-type casting machine, a spin coater, and the like. Also, the melt extrusion method may, for example, include a T-die method, an inflation method, and the like. The molding temperature is preferably in a range of 150 to 350° C., and more preferably in a range of 200 to 300° C.

When a film is molded using the T-die method, a roll-shaped film may be obtained by installing a T-die at a leading end of a known single-screw or double-screw extruder and winding a film extruded in the form of a thin film. In this case, uniaxial elongation may be performed by properly adjusting the temperature of a winding roll and elongating the film in an extrusion direction. Also, simultaneous and sequential biaxial elongations may be performed by elongating the film in a direction perpendicular to the extrusion direction.

The acrylic film may be either a non-elongated film or an elongated film. In this case, the elongated film may be either a uniaxially elongated film or a biaxially elongated film, and the biaxially elongated film may be either a simultaneously biaxially elongated film or a sequentially biaxially elongated film. When the film is biaxially elongated, the performance of the film may be improved due to improved mechanical strength. On the other hand, when another thermoplastic resin is blended with the acrylic resin and elongated, an increase in phase difference may be suppressed, and optical isotropy of the acrylic resin may be maintained.

The elongation temperature is preferably close to the glass transition temperature of the thermoplastic resin composition that is a raw material of a film. Preferably, the elongation temperature is in a range of (a glass transition temperature of –30° C.) to (a glass transition temperature of +100° C.), and more preferably in a range of (a glass transition temperature of –20° C.) to (a glass transition temperature of +80° C.). When the elongation temperature is less than (a glass transition temperature of –30° C.), sufficient elongation magnification may not be obtained. On the other hand, stable elongation may not be achieved due to the flowing of the resin composition when the elongation temperature exceeds (a glass transition temperature of +100° C.).

Meanwhile, when the elongation magnification is defined as an area ratio, the elongation magnification may preferably be in a range of approximately 1.1 to 25 times, and more preferably in a range of approximately 1.3 to 10 times. When the elongation magnification is less than 1.1 times, improvements in toughness involved in the elongation may not be realized. When the elongation magnification exceeds 25 times, effects may not occur in an amount equal to an increase in the elongation magnification.

The elongation rate in a single direction is preferably in a range of 10 to 20,000%/min, and more preferably in a range of 100 to 10,000%/min. When the elongation rate is less than 10%/min, a time required to reach sufficient elongation magnification may be lengthened, resulting in an increase in manufacturing costs. On the other hand, when the elongation rate exceeds 20,000%/min, the elongated film may be broken.

The acrylic film may be subjected to a thermal treatment (annealing) after the elongation in order to stabilize the optical isotropy or mechanical characteristics. The thermal treatment conditions are not particularly limited, and thus proper conditions known in the related art may be used herein.

Meanwhile, surface treatment may be subjected to the transparent film, as necessary, in order to improve adhesive strength. For example, at least one surface of the optical film may be subjected to at least one surface treatment selected from the group consisting of alkali treatment, corona treatment, and plasma treatment.

Next, after an operation of attaching transparent films to the polarizer by means of adhesive layers is performed, the adhesive layers are irradiated with active energy rays emitted by an energy source disposed in a single direction with respect to the polarizer.

In this case, the active energy rays may include particle beams such as alpha-particle beams, proton beams, or neutron beams, as well as UV rays, electron beams, microwaves, infrared rays (IR), X rays, and gamma rays. In general, UV rays or electron beams may be used herein.

Here, the quantity of light of the active energy rays irradiated onto the adhesive layer may, for example, be in a range of 200 mJ/cm$^2$ to 2,000 mJ/cm$^2$, 400 mJ/cm$^2$ to 1,800 mJ/cm$^2$, or 500 mJ/cm$^2$ to 1,500 mJ/cm$^2$, but the present invention is not limited thereto. When the quantity of light of the active energy rays is less than 200 mJ/cm$^2$, adhesive strength is insufficient due to a slow initial curing rate of the adhesive layer. On the other hand, when the quantity of light of the active energy rays exceeds 2,000 mJ/cm$^2$, the irradiation time may be lengthened, and an irradiation system has to be further installed, resulting in an increase in production costs, and a decrease in productivity with limitations on facilities.

Meanwhile, according to research conducted by the present inventors, it was found that there differences in adhesive strength are not especially high, according to a thickness, in the case of adhesive layers formed in a direction of irradiation with active energy rays. However, when the adhesive layer having an irradiated surface gets too thick, wrinkles may occur on the polarizing plate that is a final product. Therefore, the adhesive layer with a surface irradiated with the active energy rays is more desirable as the thickness of the adhesive layer is reduced.

In the present invention, the thickness of the adhesive layer with a surface irradiated with the active energy rays may be in a range of approximately 0.1 μm to 10 μm, preferably approximately 0.1 μm to 7 μm, and most preferably approximately 0.1 μm to 5 μm.

Subsequently, a surface of the transparent film disposed opposite to the energy source is thermally treated. According to the research conducted by the present inventors, it was found that when a thermal treatment was performed as described above, the curing rate of the adhesive layer disposed in a surface of the transparent film which was not irradiated with the active energy rays could be improved, thereby improving adhesive strength of the adhesive layer.

In this case, the thermal treatment may be performed simultaneously with irradiation with the active energy rays, or the thermal treatment and the irradiation with the active energy rays may be performed sequentially. That is, a method of thermally treating a surface of a film not irradiated with active energy rays simultaneously with irradiating the other surface of the film with the active energy rays may be performed, or a method of irradiating a surface of a film with active energy rays and thermally treating the other surface of the film not irradiated with the active energy rays as a continuous process may also be performed.

In particular, in the present invention, when an operation of thermally treating the surface of the film not irradiated with the active energy rays is performed simultaneously with the irradiation with the active energy rays, the adhesive compositions formed on both surfaces of the polarizer may be simultaneously cured. Therefore, the manufacturing time may be cut, and the processes may be simplified without requiring an additional process.

Meanwhile, the thermal treatment temperature is preferably in a range of 25° C. to 65° C., 25° C. to 60° C., or 25°

C. to 50° C. When the thermal treatment temperature is less than 25° C., adhesive strength of the non-light-irradiated surface may be deteriorated. On the other hand, when the thermal treatment temperature exceeds 65° C., the transparent film may be swollen before adhesion takes place, and thus the transparent film may be shrunk after irradiation with the active energy rays, thereby causing the formation of wrinkles across the entire polarizing plate.

Also, the thermal treatment may, for example, be performed using a drum and/or an oven, but the present invention is not limited thereto. More particularly, the thermal treatment may be performed using a method of irradiating, with active energy rays, a surface opposite to a surface of a film closely adhered to a drum and simultaneously adjusting the temperature of the drum in a range of 25° C. to 65° C., and may be performed using a method of irradiating a surface opposite to a surface of a film closely adhered to a drum with active energy rays and passing the surface, that is, a non-light-irradiated surface, of the film closely adhered to the drum through an oven so that the non-light-irradiated surface can be thermally treated by applying heat to the non-light-irradiated surface through heat rays and/or a hot air generator system.

In this regard, in a conventional method of manufacturing a double-sided polarizing plate, the polarizing plate was laminated without supporting the polarizing plate, and irradiated with active energy rays using a UV irradiation system while moving the polarizing plate. In this case, however, since there is no unit configured to support a film, wrinkles may be formed on the laminated polarizing plate in a transverse direction (i.e., a TD direction) due to curing shrinkage force. Also, when both surfaces of the polarizing plate are irradiated with active energy rays as known in the prior art, a large amount of heat is generated from a lamp in a UV irradiation system, reaction heat is generated through a reaction of the adhesive irradiated with UV rays. The heat and/or reaction heat generated thus may be used to swell and shrink the polarizing plate. In this case, undulated wrinkles may occur on the polarizing plate. Such wrinkles occurring on the polarizing plate may not be flattened, even in the case that the polarizing plate undergoes subsequent processes or the manufactured double-sided polarizing plate is adhered to a liquid crystal panel.

Further, since bubbles are easily formed on an adhered surface due to such wrinkles, interior liquid crystal panels may be produced, leading to a significant decrease in productivity.

However, when a surface of a film not directly irradiated with active energy rays is closely adhered to a drum and irradiated with active energy rays as described above in the present invention, the drum serves to support the polarizing plate, resulting in a decrease in curing shrinkage force applied to the polarizing plate. Accordingly, since it is possible to significantly reduce wrinkle formation, interior appearance of the optical film may be prevented. Also, when the double-sided polarizing plate is adhered to a liquid crystal panel, the double-sided polarizing plate has an excellent ability to reduce production of interior liquid crystal panels since bubbles are not formed on an adhered surface.

In particular, when a surface of a film not irradiated with active energy rays is adhered to the drum and the temperature of the drum is simultaneously adjusted to thermally treat the surface of the film not irradiated with active energy rays, a curing rate of the adhesive formed on the surface of the film not irradiated with active energy rays may be improved without performing an additional process, resulting in sufficient adhesive strength. Therefore, this process is very desirable since it is possible to simplify the processes and improve the adhesive strength.

Meanwhile, when the double-sided polarizing plate produced according to the method of manufacturing a double-sided polarizing plate according to the present invention is adhered to a liquid crystal panel, a region of the double-sided polarizing plate adhered to the liquid crystal panel is preferably a surface irradiated with the active energy rays. Since a UV blocking agent is generally included in a film disposed on a backlight unit, a light source among the films used in the double-sided polarizing plate, the surface irradiated with the active energy rays is preferably a surface of the film which does not include the UV blocking agent. That is, in the double-sided polarizing plate, the irradiated surface which does not include the UV rays blocking agent is preferably adhered to a liquid crystal panel.

The thickness of the adhesive layer attached to the surface not irradiated with the active energy rays is preferably in a range of approximately 0.1 µm to 3 µm. In the conventional method of manufacturing a double-sided polarizing plate, the adhesive layers may be generally formed on both surfaces of the polarizer such that the adhesive layers have the same thickness. In this case, the adhesive layers have a thickness of approximately 5 µm to 10 µm. In this case, however, the adhesive layer not directly irradiated with light has a problem in that adhesive strength may be deteriorated. Therefore, the thickness of the adhesive layers formed on both surfaces, particularly, non-light-irradiated surfaces, of the polarizer may be in a range of 0.1 µm to 3 µm in consideration of ensuring superior adhesive strength in the adhesive layers formed on the non-light-irradiated surfaces of the polarizer by once irradiation with active energy rays.

As described above, in the method of manufacturing a double-sided polarizing plate according to the present invention, including thermally treating the non-light-irradiated surface, a difference in a peel strength of the adhesive layer formed on the non-light-irradiated surface and a peel strength of the adhesive layer formed on a surface irradiated with the active energy rays may be less than or equal to 0.7 N, and, more particularly in a range of 0.005 N to 0.5 N. Therefore, it is possible to obtain a double-sided polarizing plate including the adhesive layers having excellent adhesive strength, which are formed on both surfaces of the polarizer.

In particular, in the manufacturing method according to the present invention, the irradiation with active energy rays and the thermal treatment are more preferably performed at the same time in consideration of simplifying the processes to improve productivity. In this case, the thermal treatment is more preferably performed using a drum. That is, the adhesive strength of the non-light-irradiated surface may be more easily ensured by allowing the drum to closely adhere to the non-light-irradiated surface to adjust the temperature of the drum in a range of 5° C. to 65° C. simultaneously with the irradiation with active energy rays as described above.

Meanwhile, the method of manufacturing a double-sided polarizing plate according to the present invention may further include forming a primer layer between the adhesive layer and the transparent film.

The primer layer serves to improve an adhesive strength between the transparent film and the adhesive layer. Thus, the primer layer is preferably formed of a primer composition including a urethane polymer. For example, the primer composition includes a urethane polymer, water-dispersible fine particles, and water. More particularly, the primer composition may include 1 part by weight to 50 parts by weight of the urethane polymer, 0.1 parts by weight to 10 parts by weight of the water-dispersible fine particles, and the balance of water.

The urethane polymer is obtained by allowing a polyisocyanate to react with a polyol. Any proper polyols may be used as the polyol without limitation as long as two or more hydroxyl group are contained therein in the molecule. For example, the polyol may include polyesterpolyol, polyether polyol, polycarbonatediol, and the like. As one polyol selected from the group consisting of these polyols, they may be used alone or in a combination of two or more thereof.

The polyol is preferably at least one selected from the group consisting of ethylene glycol, 1,2-propanonediol, 1,3-propanediol, 1,3-butanediol, 1,4-butanediol, neopentylglycol, pentanediol, 1,6-hexanediol, 1,8-octanediol, 1,10-decanediol, 4,4'-dihydroxyphenylpropane, 4,4'-dihydroxymethylmethane, diethylene glycol, triethylene glycol, polyethylene glycol, dipropyleneglycol, polypropyleneglycol, 1,4-cyclohexanedimethanol, 1,4-cyclohexanediol, bisphenol A, bisphenol F, glycerine, 1,1,1-trimethylolpropane, 1,2,5-hexatriol, pentaerythritol, glucose, sucrose, and sorbitol.

Meanwhile, the polyester polyol may be typically obtained by allowing a polyol component to react with a polybasic acid component. The polybasic acid component may, for example, include an aromatic dicarboxylic acid such as ortho-phthalic acid, isophthalic acid, terephthalic acid, 1,4-naphthalenedicarboxylic acid, 2,5-naphthalenedicarboxylic acid, 2,6-naphthalenedicarboxylic acid, biphenyldicarboxylic acid, or tetrahydrophthalic acid; an aliphatic dicarboxylic acid such as oxalic acid, succinic acid, malonic acid, glutaric acid, adipic acid, pimelic acid, suberic acid, azelaic acid, sebacic acid, linoleic acid, maleic acid, fumaric acid, mesaconic acid, or itaconic acid; an alicyclic dicarboxylic acid such as hexahydrophthalic acid, tetrahydrophthalic acid, 1,3-cyclohexanedicarboxylic acid, or 1,4-cyclohexanedicarboxylic acid; or a reactive derivative thereof with an acid anhydride, an alkyl ester, an acid halide, and the like. They may be used alone or in a combination of two or more thereof. In addition, the polybasic acid component is more preferably at least one selected from the group consisting of polytetramethyleneglycol (PTMG), polypropyleneglycol (PPG), and polyethylene glycol (PEG).

The polycarbonate polyol is preferably at least one selected from the group consisting of poly(hexamethylene carbonate) glycol, and poly(cyclohexanecarbonate) glycol.

The polyether polyol may be typically obtained by adding an alkylene oxide to a polyhydric alcohol by ring opening polymerization. For example, the polyhydric alcohol may include ethylene glycol, diethylene glycol, propylene glycol, dipropylene glycol, glycerine, trimethylol propane, and the like. They may be used alone or in a combination of two or more thereof.

A compound having two or more NCO groups may be used as the isocyanate without limitation. For example, the isocyanate may include toluene diisocyanate (TDI), 4,4-diphenylmethane diisocyanate (MDI), 1,5-naphthalene diisocyanate (NDI), tolidine diisocyanate (TODI), hexamethylene diisocyanate (HMDI), isophorone diisocyanate (IPDI), p-phenylene diisocyanate, transcyclohexane, 1,4-diisocyanate, and xylene diisocyanate (XDI), which may be used alone or in a combination of two or more thereof, selected from the group.

The urethane resin may be manufactured using any proper methods known in the related art. More particularly, such methods may include a one-step method of allowing the respective components to react with each another at once, and a multi-step method of allowing the respective components to react with each another step by step. When the urethane resin has a carboxyl group, the urethane resin is preferably prepared using the multi-step method. This is because the carboxyl group may be easily introduced into the urethane resin using the multi-step method. Further, any proper urethane-reactive catalysts may be used upon the manufacturing of the urethane resin.

In the manufacturing of the urethane resin, other polyols and/or other chain extenders may participate in a reaction in addition to the above-described components.

The other polyols may, for example, include polyols having three or more hydroxyl groups, such as sorbitol, glycerine, trimethylolethane, trimethylolpropane, pentaerythritol, and the like.

The other chain extenders may, for example, include glycols such as ethylene glycol, diethylene glycol, triethylene glycol, 1,3-propanediol, 1,3-butanediol, 1,4-butanediol, neopentyl glycol, pentanediol, 1,6-hexanediol, and propyleneglycol; aliphatic diamines such as ethylenediamine, propylenediamine, hexamethylenediamine, 1,4-butanediamine, and aminoethylethanolamine; alicyclic diamines such as isophoronediamine, and 4,4'-dicyclohexylmethanediamine; aromatic diamines such as xylenediamine, and tolylenediamine, and the like.

Further, a neutralizing agent may be used in the manufacturing of the urethane resin. When the neutralizing agent is used, stability of the urethane resin in water may be improved. For example, the neutralizing agent may include ammonia N-methylmorpholine, triethylamine, dimethylethanolamine, methyldiethanolamine, triethanolkyne, morpholine, tripropylamine, ethanolamine, or triisopropanolamine, which may be used alone or in a combination of two or more thereof.

In the manufacturing of the urethane resin, an organic solvent inert to the polyisocyanate and compatible with water is preferably used. The corresponding organic solvent may include an ester-based solvent such as ethyl acetate, or ethyl cellosolve acetate; a ketone-based solvent such as acetone, methyl ethyl ketone, or methylisobutylketone; an ether-based solvent such as dioxane tetrahydrofuran, or the like, which may be used alone or in a combination of two or more thereof.

Meanwhile, the urethane polymer more preferably includes a carboxyl group. When the urethane polymer includes the carboxyl group, water dispersibility may be improved, leading to improvements in close adhesion between the adhesive layer and the transparent film.

The urethane polymer containing the carboxyl group may be obtained, for example, by adding a polyol and a polyisocyanate and allowing the polyol and the polyisocyanate to react with a chain extender containing a free carboxyl group. The chain extender containing a carboxyl group may include dihydroxycarboxylic acid, or dihydroxysuccinic acid. The dihydroxycarboxylic acid may, for example, include dialkylol alkanoic acids including a dimethylol alkanoic acid such as dimethylol acetic acid, dimethylol butanoic acid, dimethylol propionic acid, dimethylol butyric acid, or dimethylol pentanoic acid, which may be alone or in a combination of two or more thereof.

Meanwhile, the content of the urethane polymer may be in a range of approximately 1 part by weight to 50 parts by weight, more preferably approximately 3 parts by weight to 20 parts by weight, and most preferably approximately 5 parts by weight to 15 parts by weight, based on 100 parts by weight of the primer composition. When the urethane polymer is included in a content of less than 1 part by weight, based on 100 parts by weight of the primer composition, adhesivity may be deteriorated. On the other hand, when the content of the urethane polymer exceeds 50 parts by weight, leveling may not be achieved due to an increase in viscosity during a coating process, resulting in an increase in drying time.

Also, the urethane polymer preferably has a weight average molecular weight of 10,000 to 100,000. When the molecular weight of the urethane polymer is less than 10,000, adhesive strength may be deteriorated. On the other hand, when the molecular weight of the urethane polymer exceeds 100,000, it is difficult to prepare a water-dispersible urethane.

Next, any proper fine particles, preferably water-dispersible fine particles, may be used as the water-dispersible fine particles that may be used in the present invention. More particularly, all types of inorganic fine particles and organic fine particles may be used herein. The inorganic fine particles may, for example, include inorganic oxides such as silica, titania, alumina, zirconia, antimony-based inorganic oxides, and the like. The organic fine particles may, for example, include a silicone-based resin, a fluorine-based resin, a (meth)acrylic resin, a cross-linked polyvinyl alcohol, a melamine-based resin, and the like.

Among the water-dispersible fine particles, silica is preferably used. Silica does not cause hazing and is not colored since the silica has a superior blocking inhibitory ability, and also exhibits excellent transparency. Therefore, silica has a less influence on optical properties of the polarizing plate. Also, since silica exhibits good dispersibility and dispersion stability for the primer composition, workability may be superior upon formation of the primer layer.

The water-dispersible fine particles preferably have an average diameter (i.e., an average primary particle diameter) of 10 nm to 200 nm, and more preferably 20 nm to 70 nm. When the average diameter of the water-dispersible fine particles is less than 10 nm, condensation and thus precipitation of silica in a primer solution may occur due to an increase in surface energy, leading to a decrease in stability of the primer solution. On the other hand, when the average diameter of the water-dispersible fine particles is greater than 200 nm, silica is not dispersed in the primer solution, and light having a wavelength of 400 nm is scattered due to an increase in visual wavelength range (400 nm to 800 nm) when the particles are lumped, thereby causing an increase in haze. By using the fine particles within the above-detailed particle diameter range, unevenness may be properly formed on a surface of the primer layer, thereby effectively reducing a frictional force in a contact surface between the acrylic film and the primer layer and/or between the primer layers. As a result, a blocking inhibitory ability may be superior.

Meanwhile, the content of the water-dispersible fine particles is preferably in a range of approximately 0.1 parts by weight to 10 parts by weight, based on 100 parts by weight of the primer composition. When the content of the water-dispersible fine particles is less than 0.1 parts by weight, films may be broken since the slipping between films does not occur during a winding process. On the other hand, when the content of the water-dispersible fine particles exceeds 10 parts by weight, hazing may take place.

Since the primer composition according to the present invention is soluble in water, the fine particles are preferably blended into an aqueous dispersion. More particularly, when silica is used as the fine particles, the silica is preferably blended in the form of colloidal silica. Products themselves commercially available in the related art may be used as the colloidal silica. For example, Snowtex (Nissan Chemical Industries, Ltd.), AEROSIL (Air Products & Chemicals Inc.), Epostar and Soliostar RA (Nippon Shokubai), LSH (Ranco), and the like may be used herein.

Meanwhile, the primer composition may further include a cross-linking agent, as necessary. A methylol compound such as oxazoline, boric acid, or trimethylolmelamine, carbodiimide, isocyanate, or an aziridine compound may be used as the cross-linking agent.

Also, the cross-linking agent is preferably included in a content of 0.1 parts by weight to 30 parts by weight, based on 100 parts by weight of the primer composition. When the primer composition including the cross-linking agent is used, the primer layer serves to prevent penetration of water, and thus the primer composition exhibits superior optical properties such as water resistance and heat and humidity resistance.

Further, the primer composition may further include a silane coupling agent, a fluorine-based surfactant, a silane-based surfactant, and a surfactant containing an alkyl group as other additives, as necessary.

Meanwhile, the primer layer formed of the primer composition as described above preferably has a thickness of approximately 100 nm to 1 μm. When the thickness of the primer layer is less than 100 nm, adhesive strength may be deteriorated. On the other hand, when the thickness of the primer layer exceeds 1 μm, the primer layer may not be properly dried during a primer coating process, and thus films may be broken due to blocking between the films.

Also, the water contact angle of a surface of the primer layer according to the present invention is preferably in a range of 40° to 100°, more preferably in a range of 50° to 90°, and more preferably in a range of 60° to 80°. When the water contact angle is less than 40°, the primer layer may react with iodine in the polarizer due to strong hydrophilicity to inhibit arrangement of iodine, resulting in distraction of prototype color phase and inhibition of polarization degree. On the other hand, when the water contact angle exceeds 100°, it is difficult for the primer layer to adhere to the polarizer due to strong hydrophobicity.

In the above-described method of manufacturing a double-sided polarizing plate according to the present invention, the formation of the primer layer may be performed using methods widely known in the related art, but the present invention is not limited thereto. For example, the double-sided polarizing plate may be manufactured using a method including coating one surface of a transparent film with a primer composition to form a primer layer, coating one surface of the primer layer or polarizer with an adhesive composition to form an adhesive layer, laminating the polarizer and the transparent film, and curing the adhesive composition by irradiation with light. In this case, a method of coating the primer composition may, for example, be performed using a method such as a bar coating method, a gravure coating method, or a slot-die coating method.

Meanwhile, the double-sided polarizing plate of the present invention manufactured by the above-described method may be effectively used for optical devices such as liquid crystal display devices, and the like. For example, the optical device according to the present invention may be a liquid crystal display device including a liquid crystal panel and polarizing plates provided on both surfaces of the liquid crystal panel. In this case, at least one of the polarizing plates may be the polarizing plate according to the present invention. In this case, types of the liquid crystal panel included in the liquid crystal display device are not particularly limited. For example, all types of known panels, for example, an passive matrix panel such as a twisted nematic (TN) panel, super-twisted nematic (STN) panel, a ferroelectic (F) panel, or a polymer-dispersed (PD) panel; an active matrix panel such as a two-terminal panel, or a three-terminal panel; an in-plane switching (IPS) panel, and a vertical alignment (VA) panel, may be used, but the present invention is not limited thereto. Also, types of further components, for example, upper and lower substrates (i.e., a color filter substrate, or an array substrate), constituting the liquid crystal display device are not also particularly limited. For example, components known in the related art may be used therefor without limitation.

MODE FOR INVENTION

Preparative Example 1

Preparation of Acrylic Film

A resin composition in which a poly(N-cyclohexylmaleimide-co-methyl methacrylate) resin, a styrene-anhydrous maleic acid copolymeric resin and a phenoxy-based resin were uniformly mixed at a weight ratio of 100:2.5:5 was fed to a 24φ extruder in which a space spanning from a feed hopper to an extruder was replaced with nitrogen, and melted at 250° C. to prepare a feed pellet.

PKFE (Mw=60,000, Mn=16,000, Tg=95° C.; commercially available from InChemRez®) was used as the phenoxy-based resin, Dylaeck 332 including styrene at 85% by weight and anhydrous maleic acid at 15% by weight was used as the styrene-anhydrous maleic acid copolymeric resin, and the poly(N-cyclohexylmaleimide-co-methyl methacrylate) resin was analyzed through NMR. As a result, the content of N-cyclohexylmaleimide was 6.5% by weight.

The resulting feed pellet was dried under a vacuum, melted at 260° C. in an extruder, and passed through a coat hanger-type T-die, followed by a chromium-plated casting roll and a drying roll, thereby manufacturing a film having a thickness of 150 μm. The film was elongated at 125° C. in an MD direction using Pilot Elongation equipment to manufacture an acrylic film. In this case, the film was elongated at a percentage of 170% using a difference in speeds of rolls.

The acrylic film manufactured thus was treated with corona, and one surface of the acrylic film was coated with a primer composition, in which 20 parts by weight of an oxazoline cross-linking agent (WS700, commercially available from Nippon Shokubai) was added to a primer composition having a solid content of 10% by weight prepared by diluting CK-PUD-F (a urethane dispersion commercially available from Chokwang Paint Ltd.) with pure water, using a #7 bar, and elongated at 130° C. in a TD direction to a percentage of 190% using a tender to manufacture an acrylic film including a primer layer having a thickness of 400 nm.

Preparative Example 2

Preparation of Adhesive Composition (1) Adhesive Composition A

Five parts by weight of a cationic initiator, CPI 100P (commercially available from Sanapro), was added to 100 parts by weight of a resin composition prepared by adding 25% by weight of 3,4-epoxycyclohexylmethyl-3,4'-epoxycyclohexanecarboxylate (Celloxide 2021P commercially available from Dicel), 25% by weight of 1,4-cyclohexane dimethanol diglycidyl ether, 35% by weight of 3-ethyl-3-[(3-ethyloxetan-3-yl)methoxymethyl]oxetane (Toa Gosei Aaron Oxetane DOX221), and 15% by weight of 3-ethyl-3-hydroxymethyloxetane (Toa Gosei Aaron Oxetane OXA) to prepare an adhesive composition A for polarizing plates.

(2) Adhesive Composition B

Five parts by weight of a cationic initiator, CPI 100P (commercially available from Sanapro), and 5 parts by weight of vinyltriethylsilane were added to 100 parts by weight of a resin composition prepared by adding 25% by weight of 3,4-epoxycyclohexylmethyl-3,4'-epoxycyclohexanecarboxylate (Celloxide 2021P commercially available from Dicel), 25% by weight of 1,4-cyclohexane dimethanol diglycidyl ether, and 50% by weight of 3-ethyl-3-[(3-ethyloxetan-3-yl)methoxymethyl]oxetane (Toa Gosei Aaron Oxetane DOX221) to prepare an adhesive composition B for polarizing plates.

(3) Adhesive Composition C

Five parts by weight of a cationic initiator, CPI 100P (commercially available from Sanapro), and 5 parts by weight of vinyl acetate were added to 100 parts by weight of a resin composition prepared by adding 25% by weight of 3,4-epoxycyclohexylmethyl-3,4'-epoxycyclohexanecarboxylate (Celloxide 2021P commercially available from Dicel), 25% by weight of 1,4-cyclohexane dimethanol diglycidyl ether, and 50% by weight of 3-ethyl-3-[(3-ethyloxetan-3-yl)methoxymethyl]oxetane (Toa Gosei Aaron oxetane DOX221) to prepare an adhesive composition C for polarizing plates.

Example 1

Primer layers of the two acrylic films prepared in Preparative Example 1 were coated with adhesive composition A, using a microgravure coater, so that the final thickness of each of adhesive layers amounted to 1 μm. Thereafter, the two acrylic films coated with the adhesive composition were laminated on both surfaces of a PVA element. Then, one surface of the PVA element was unidirectionally irradiated with UV rays with a quantity of light of 900 mJ/cm$^2$ using a UV irradiation system (a fusion lamp, D bulb), and a surface of the acrylic film disposed opposite to the UV irradiation system was closely adhered to a drum at the same time. The temperature of the drum was adjusted to 25° C. to manufacture a polarizing plate.

Example 2

A polarizing plate was manufactured in the same manner as in Example 1, except that the adhesive composition B was used as the adhesive composition.

Example 3

A polarizing plate was manufactured in the same manner as in Example 1, except that the adhesive composition C was used as the adhesive composition.

Example 4

A polarizing plate was manufactured in the same manner as in Example 1, except that the temperature of the drum was set to 30° C.

Example 5

A polarizing plate was manufactured in the same manner as in Example 1, except that the temperature of the drum was set to 40° C.

Example 6

A polarizing plate was manufactured in the same manner as in Example 1, except that the temperature of the drum was set to 60° C.

Example 7

Primer layers of the two acrylic films prepared in Preparative Example 1 were coated with adhesive composition A, using a microgravure coater, so that the final thickness of each of adhesive layers amounted to 1 μm. Thereafter, the two acrylic films coated with the adhesive composition were laminated on both surfaces of a PVA element. Then, one surface of the PVA element was unidirectionally irradiated with UV rays with a quantity of light of 900 mJ/cm$^2$ using a UV irradiation system (a fusion lamp, D bulb), and a surface of the acrylic film disposed opposite to the UV irradiation system was then passed through an oven whose temperature was set to 30° C., thereby manufacturing a polarizing plate.

Example 8

A polarizing plate was manufactured in the same manner as in Example 7, except that the temperature of the oven was set to 40° C.

Example 9

A polarizing plate was manufactured in the same manner as in Example 7, except that the temperature of the oven was set to 60° C.

Comparative Example 1

A polarizing plate was manufactured in the same manner as in Example 1, except that the temperature of the drum was set to 15° C.

Comparative Example 2

A polarizing plate was manufactured in the same manner as in Example 1, except that the temperature of the drum was set to 70° C.

Comparative Example 3

A polarizing plate was manufactured in the same manner as in Example 7, except that the temperature of the oven was set to 70° C.

Comparative Example 4

Adhesive composition A was pre-heated at 60° C., and primer layers of the two acrylic films prepared in Preparative Example 1 were coated with the heated adhesive composition A, using a microgravure coater, so that the final thickness of each of adhesive layers amounted to 1 μm. Thereafter, the two acrylic films coated with the adhesive composition were laminated on both surfaces of a PVA element. Then, one surface of the PVA element was unidirectionally irradiated with UV rays with a quantity of light of 900 mJ/cm$^2$ using a UV irradiation system (a fusion lamp, D bulb), thereby manufacturing a polarizing plate.

Experimental Example 1

Evaluation of Peel Strength of Polarizing Plates

The peel strengths of the adhesive layers formed on surfaces which were directly irradiated with active energy rays and not irradiated with the active energy rays with respect to the polarizing plates manufactured in Examples 1 to 9 and Comparative Examples 1 to 4 were measured. The peel strength of a polarizing plate having a width of 20 mm and a length of 100 mm was measured by peeling a surface of the acrylic film, which was not irradiated with UV rays, from a PVA element at a rate of 300 mm/min and an angle of 90°. The results are listed in the following Table 1. The peel strength is indicated by OK when the peel strength is greater than or equal to 2 N, and indicated by NG when the peel strength is less than 2 N.

Experimental Example 2

Evaluation of Appearance of Polarizing Plates

The appearance of each of the polarizing plates manufactured in Examples 1 to 9 and Comparative Examples 1 to 4 was observed with the naked eye to determine whether wrinkles occurred and whether curling was observed in MD and TD directions. The results are listed in the following Table 1. OK: No wrinkles and curls in MD and TD directions, and NG: There are wrinkles and curls in MD and/or TD directions.

TABLE 1

| Items | Primer UV-irradiated surface | Primer Non-light-irradiated surface | Thermal treatment system for Non-light-irradiated surface | Thermal treatment temperature of Non-irradiated surface | Adhesive | Thickness of Adhesive layer (μm) | Peel strength of UV-irradiated surface measured | Peel strength of non-light-irradiated surface measured | Evaluation of appearance |
|---|---|---|---|---|---|---|---|---|---|
| Ex. 1 | CkPUDF + WS700 20 parts by weight | CkPUDF + WS700 20 parts by weight | Drum | 25 | A | 1 | OK | OK | OK |
| Ex. 2 | CkPUDF + WS700 20 parts by weight | CkPUDF + WS700 20 parts by weight | Drum | 25 | B | 1 | OK | OK | OK |

TABLE 1-continued

| Items | Primer UV-irradiated surface | Primer Non-light-irradiated surface | Thermal treatment system for Non-light-irradiated surface | Thermal treatment temperature of Non-irradiated surface | Adhesive | Thickness of Adhesive layer (µm) | Peel strength of UV-irradiated surface measured | Peel strength of non-light-irradiated surface measured | Evaluation of appearance |
|---|---|---|---|---|---|---|---|---|---|
| Ex. 3 | CkPUD F + WS700 20 parts by weight | CkPUD F + WS700 20 parts by weight | Drum | 25 | C | 1 | OK | OK | OK |
| Ex. 4 | CkPUD F + WS700 20 parts by weight | CkPUD F + WS700 20 parts by weight | Drum | 30 | A | 1 | OK | OK | OK |
| Ex. 5 | CkPUD F + WS700 20 parts by weight | CkPUD F + WS700 20 parts by weight | Drum | 40 | A | 1 | OK | OK | OK |
| Ex. 6 | CkPUD F + WS700 20 parts by weight | CkPUD F + WS700 20 parts by weight | Drum | 60 | A | 1 | OK | OK | OK |
| Ex. 7 | CkPUD F + WS700 20 parts by weight | CkPUD F + WS700 20 parts by weight | Oven | 30 | A | 1 | OK | OK | OK |
| Ex. 8 | CkPUD F + WS700 20 parts by weight | CkPUD F + WS700 20 parts by weight | Oven | 40 | A | 1 | OK | OK | OK |
| Ex. 9 | CkPUD F + WS700 20 parts by weight | CkPUD F + WS700 20 parts by weight | Oven | 60 | A | 1 | OK | OK | OK |
| Com. Ex. 1 | CkPUD F + WS700 20 parts by weight | CkPUD F + WS700 20 parts by weight | Drum | 15 | A | 1 | OK | NG | OK |
| Com. Ex. 2 | CkPUD F + WS700 20 parts by weight | CkPUD F + WS700 20 parts by weight | Drum | 70 | A | 1 | OK | OK | NG |
| Com. Ex. 3 | CkPUD F + WS700 20 parts by weight | CkPUD F + WS700 20 parts by weight | Oven | 70 | A | 1 | OK | OK | NG |

TABLE 1-continued

| Items | Primer UV-irradiated surface | Primer Non-light-irradiated surface | Thermal treatment system for Non-light-irradiated surface | Thermal treatment temperature of Non-irradiated surface | Adhesive | Thickness of Adhesive layer (μm) | Peel strength of UV-irradiated surface measured | Peel strength of non-light-irradiated surface measured | Evaluation of appearance |
|---|---|---|---|---|---|---|---|---|---|
| Com. Ex. 4 | CkPUD F + WS700 20 parts by weight | CkPUD F + WS700 20 parts by weight | | Adhesive composition heated at 60° C. before curing (No separate thermal treatment on non-light-irradiated surface) | A | 1 | OK | NG | NG |

The present invention has been described in detail. However, it should be understood that the detailed description and specific examples, while indicating preferred embodiments of the invention, are given by way of illustration only, since various changes and modifications within the scope of the invention will become apparent to those skilled in the art from this detailed description.

The invention claimed is:

1. A method of manufacturing a double-sided polarizing plate, comprising:
   attaching transparent films to both surfaces of a polarizer by means of adhesive layers;
   irradiating the adhesive layers with active energy rays emitted by an energy source disposed in a single direction with respect to the polarizer; and
   thermally treating a surface of the transparent film disposed opposite to the energy source at a temperature of 30° C. to 50° C.,
   wherein the thermal treatment is performed in a drum,
   wherein the irradiation with the active energy rays is performed simultaneously with the thermal treatment,
   wherein the adhesive layers are formed using a cationic adhesive,
   wherein the cationic adhesive includes (1) 5 to 90 parts by weight of an epoxy compound having at least two epoxy groups in a molecule; (2) 5 to 90 parts by weight of an oxetane compound having at least one oxetanyl group in the molecule; and (3) 0.5 to 20 parts by weight of an optical cationic photopolymerization initiator, based on a total of 100 parts by weight of an adhesive composition,
   wherein the epoxy compound is a combination of a first epoxy compound containing one or more epoxidized alicyclic groups and a second epoxy compound containing one or more glycidyl ether groups, and
   wherein the first epoxy compound and the second epoxy compound are mixed at a weight ratio of 1:1 to 3:1.

2. The method of claim 1, further comprising simultaneously curing the adhesive layers formed on both surfaces of the polarizer by once irradiation with the active energy rays.

3. The method of claim 1, wherein the adhesive layer formed on the transparent film having the energy source disposed therein has a thickness of 0.1 μm to 10 μm.

4. The method of claim 1, wherein the adhesive layer formed on the transparent film disposed opposite to the energy source has a thickness of 0.1 μm to 3 μm.

5. The method of claim 1, wherein the cationic adhesive further comprises at least one selected from the group consisting of a silane coupling agent, a vinyl-based compound, and a radical polymerizable monomer.

6. The method of claim 1, wherein at least one of the transparent films formed on both surfaces of the polarizer is an acrylic film.

7. The method of claim 1, further comprising forming a primer layer between at least one surface of the adhesive layer and at least one surface of the transparent film.

8. The method of claim 7, wherein the primer layer has a thickness of 100 nm to 1 μm.

9. The method of claim 7, wherein the primer layer is formed of a primer composition comprising 1 to 50 parts by weight of a urethane polymer; 0.1 to 10 parts by weight of water-dispersible fine particles; and the balance of water, based on a total of 100 parts by weight of the primer composition.

10. The method of claim 9, wherein the primer composition further comprises a cross-linking agent.

* * * * *